(12) United States Patent
Lee

(10) Patent No.: US 6,597,168 B1
(45) Date of Patent: Jul. 22, 2003

(54) LESS CURRENT CONSUMING NON-CONTACT TYPE 2-CHANNEL ROTARY POSITIONING SENSOR

(75) Inventor: Hyo-Moon Lee, Pusan (KR)

(73) Assignee: Control & Measurement Systems Co., Ltd., Pusan (KR)

( * ) Notice: Subject to any disclaimer, the term of this patent is extended or adjusted under 35 U.S.C. 154(b) by 0 days.

(21) Appl. No.: 09/958,494

(22) PCT Filed: Jun. 11, 2001

(86) PCT No.: PCT/KR01/00993
§ 371 (c)(1),
(2), (4) Date: Oct. 10, 2001

(87) PCT Pub. No.: WO03/027606
PCT Pub. Date: Apr. 3, 2003

(51) Int. Cl.[7] .......................... G01B 7/30; G01R 33/07; G01R 33/025
(52) U.S. Cl. .............................. 324/207.2; 324/207.12; 324/207.25
(58) Field of Search .................. 324/207.2, 207.21, 324/207.12, 207.25, 251, 252, 173, 174; 338/327, 32 R; 360/112

(56) References Cited

U.S. PATENT DOCUMENTS

| | | | | |
|---|---|---|---|---|
| 3,988,710 A | * | 10/1976 | Sidor et al. | 338/32 R |
| 5,087,879 A | * | 2/1992 | Sugifune et al. | 324/207.25 |
| 5,818,038 A | * | 10/1998 | Kerkmann et al. | 250/231.13 |
| 6,133,730 A | * | 10/2000 | Winn | 324/207.22 |
| 6,265,865 B1 | * | 7/2001 | Engel et al. | 324/207.2 |
| 6,340,884 B1 | * | 1/2002 | Wolf et al. | 324/207.21 |
| 6,367,337 B1 | * | 4/2002 | Schlabach | 73/862.331 |

* cited by examiner

Primary Examiner—Edward Lefkowitz
Assistant Examiner—Reena Aurora
(74) Attorney, Agent, or Firm—Notaro & Michalos P.C.

(57) ABSTRACT

The present invention relates to a less current consuming noncontact type 2-channel rotary positioning sensor which can accurately measure the magnitude of the magnetism caused by the rotation of a rotating body by eliminating the imbalance of the magnetism that can be generated due to the eccentricity of the rotating body, by sensing with two hall element the magnitude of magnetism detected by two sensing bars located in opposite places.

6 Claims, 8 Drawing Sheets

Vsw = switch voltage
Vref = reference input voltage

LESS CURRENT CONSUMING NON-CONTACT TYPE 2-CHANNEL ROTARY POSITIONING SENSOR

FIELD AND BACKGROUND OF THE INVENTION

The present invention relates generally to a less current consuming non-contact type 2-channel rotary positioning sensor, and more specifically to a less current consuming non-contact type 2-channel rotary positioning sensor which can accurately measure the magnitude of the magnetism caused by the rotation of a rotating body by eliminating the imbalance of the magnetism that can be generated due to the eccentricity of the rotating body. This invention includes the use of a special geometrical arrangement of sensing bars with two hall elements producing two all most identical linear analog signals. In addition switches are provided by the use of comparator generated switch positions. A microprocessor capable of analog to digital conversion is also included in the present invention to allow digital conversion of the analog signals. The present invention facilates communication with other equipment such as the ECU of a vehicle.

A rotary positioning sensor is conventionally used to apply continuously changing physical changes of a rotating body to electric circuits. Rotary positioning sensors equipped with electric signal output are utilized in various ways in many industries. For example, they are used for the control of the engine throttle valve position for a transport vehicle, rotation angle control of a steering shaft, treading control of an electromagnetic accelerator pedal, positioning control of heavy equipment or farm machines, or on-off measurement of a fluid feed valve.

The methods of measuring rotary positioning include potentiometric sensing, coded disk shaft encoder sensing, hall elements sensing, magneto-resistive sensing, and inductive sensing types. In actual use, it should be possible to operate at temperatures of −40° C. to +70° C. required by extreme operating conditions of, for example, a commercial vehicle or heavy equipment and to maintain a minimum endurance period of about 5 million operating cycles. In addition the accuracy of any switch position should be kept within an error range of ±2% throughout the life of the position sensor together with an endurance exceeding the minimum endurance period of 5 million operation cycles required in working environments of dust and vibration.

Unfortunately the conventional contact potentiometric rotary positioning sensor, which is made of a printed circuit board (hereinafter to be referred to as PCB) or a ceramic board processed with resistance tracks, has drawbacks such as change of electric characteristics due to temperatures and limits to the endurance period and component life due to brush wear. As a result, there are other problems related to the conventional contact resistance potentiometer.

First, with some applications the potentiometer is calibrated to various set points prior to delivery. However experience has shown that after a certain period of operation on a vehicle, the set points have drifted away from specification and exceed a limit value in many cases.

Second, because of the moving wear contact between the electric resistance track and the brush, there is frequently a deterioration in the integrity of the electrical contact between the brush and track. This can make the output signal more vulnerable to the electrical noise caused by the peripheral electric devices and extreme operating conditions (dust, moisture, vibration, temperature). Such electrical noise changes durability and accuracy.

Third, it is impossible to have one design for all applications based on the conventional potentiometer. Design change and further validation of the design is necessary to optimize the conventional potentiometer for different applications which all add to the cost of a product. Examples where major design changes would be needed include the maximum limit to the rated capacity (0.5 watt rated for commercial vehicle, 1.5 watts for heavy equipment) and a change in resistance value (2.5 kW, 5 kW, single track, double track). Each application would require a new design of potentiometer and associated development and tooling costs.

Fourth, in the conventional potentiometer the sensor switch load capacity is restricted to 50 mA or less on average, which has limitations in controlling the load in various control circuits where the potentiometer may be used.

Fifth, a conventional type contact potentiometer with two or more switches built in the sensor is limited by the power supplied from an electromagnetic unit.

SUMMARY OF THE INVENTION

It is an object of the present invention to provide a less current consuming non-contact type 2-channel rotary positioning sensor that can accurately provide two independent linear analog measurements of the magnitude of magnetism caused by the rotation of a rotating body. This measurement can be obtained by eliminating the imbalance of magnetism that can occur due to the eccentricity of the rotating body. Two hall elements are used to sense the magnitude of magnetism detected by sensing bars located in different positions.

It is another object of the present invention to facilitate the measurement of the intensity of magnetic force in two different positions either in the same direction or mutually reverse direction according to the positioning of the hall element.

It is yet another object of this invention to provide a less current consuming non-contact type 2-channel rotary positioning sensor that can communicate with a rotating body to quantitatively detect each position of the rotating body. Linear analog measurements are converted into high-resolution digital signals using an analog-to-digital converter.

It is yet another object of this invention to provide a less current consuming non-contact type 2-channel rotary positioning sensor that can eliminate problematic limited life and electric sparks that can occur due to mechanical wear. The present invention also reduces the number and size of parts, and reduces the manufacturing cost. In addition, by using a non-contact type photocoupler in present invention to replace the contact type switch used in conventional type of potentiometer electrical contact damage is eliminated.

It is still yet another object of this invention to provide a less current consuming non-contact type 2-channel rotary positioning sensor that can provide accurate output values with high linearity and low hysterises so that a stable output signal can be guaranteed even during unstable power supply. This avoids electrical noise associated with extreme operating conditions such as temperature change, power source noise, noise due to amplification, electric motor, compressor, dust, moisture, and vibration.

It is further another object of this invention to provide a less current consuming non-contact type 2-channel rotary positioning sensor that can output both analogue and digital signals with the same product and can operate two or more signal switches in various rotary positions. This achieved by the use of a microprocessor (e.g., modification of a microprocessor algorithm) and an analogue comparator circuit.

It is further another object of this invention to provide a less current consuming non-contact type 2-channel rotary positioning sensor with an average power consumption less than 25 mA. In addition the present invention can operate three signal switches having a load capacity of 50 mA or less in various rotary positions and the actual switch value can be altered depend on the application by simple changes to the comparator circuit without the need for redesign or remanufacture associated with normal contact type.

Accordingly, a less current consuming non-contact type 2-channel rotary positioning sensor a housing with a receipt seat formed on the bottom, a cover with sensor mounting holes and through hole for covering the housing, a rotating body whose one end seats on the receipt seat of the housing and whose flange in the middle is joined to the circumference of the through hole of the cover to be supported in a rotatable manner within the housing and whose top end is formed with a coupling slot, a rotary shaft whose one end is coupled with the rotating body by a coupling protuberance inserted into the coupling slot and whose other end is coupled with the rotary object to be measured, a permanent magnet inserted into the base of the rotating body, sensing bars placed in parallel around the base of the rotating body to detect the location of the permanent magnet, and a PCB placed in the housing so as to join with the sensing bars by interposing one or more hall element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
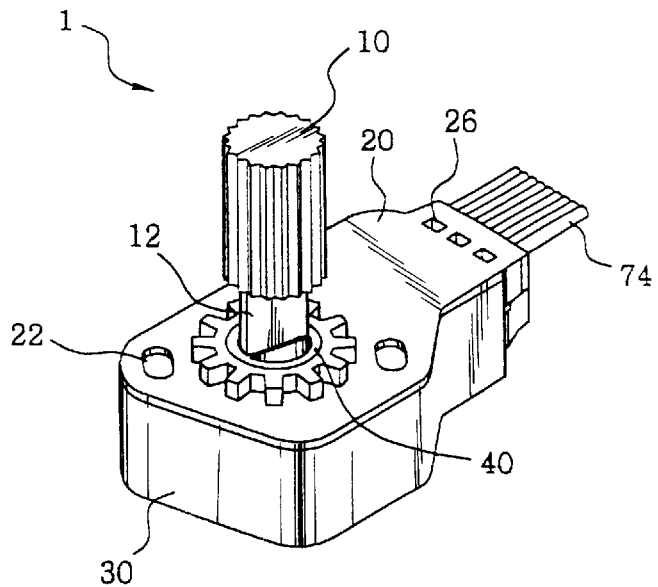
FIG. 1 is a perspective view of a less current consuming non-contact type 2-channel rotary positioning sensor of the present invention.

First, as shown in FIG. 1, a less current consuming non-contact type 2-channel rotary positioning sensor 1 according to the present invention is equipped with a rotary shaft 10 with spline formed for being joined with the object to be measured such as an engine, motor frame or pedal. The rotary shaft 10 is mounted on a housing 30 in a rotatable manner. The top of the housing 30 is covered with a cover 20, and the rear of housing 30 has a number of protruding wires 74. At the ends of these wires 74, terminals of various forms not shown are inserted to be connected with connectors or wire harnesses not shown.

In the cover 20, sensor mounting holes 22 are formed, which penetrate the housing 30 to couple the rotary positioning sensor 1 of the present invention with the object to be measured. At one end are formed adhesive injecting holes 26 for injecting adhesives such as silicone to prevent float of wires 74.

Figure 2:
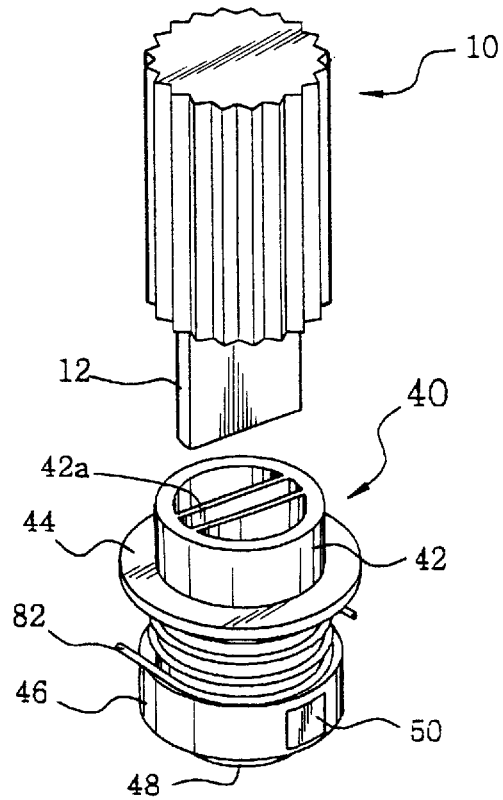
FIG. 2 is an exploded view of a rotating body illustrated in FIG. 1.
Figure 3:
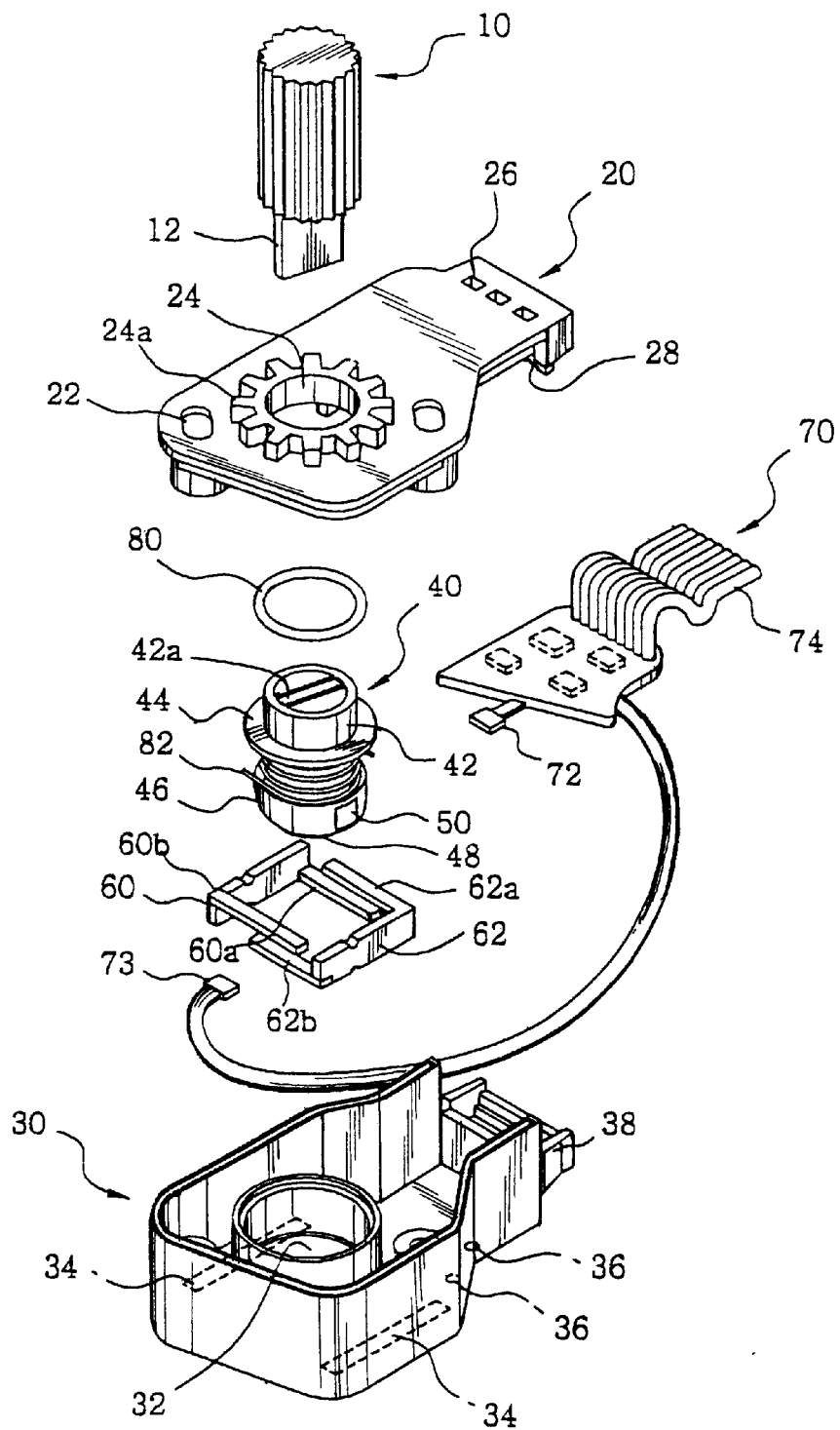
FIG. 3 is an exploded view of the less current consuming non-contact type 2-channel rotary positioning sensor illustrated in FIG. 1.

Next, as shown in FIGS. 2 and 3, the rotary shaft 10 is joined to the rotating body 40 through a coupling protuberance 12 which is formed at the bottom thereof, and around the rotating body 40, two sensing bars 60 and 62 are placed. A permanent magnet 50 is inserted in the bottom end base 46 of the rotating body 40, and the sensing bars 60 and 62 sense the positioning of the permanent magnet 50 transmitted through the rotary shaft 10. The sensing bars transmit the positioning to a PCB 70.

The permanent magnet 50 is inserted in advance during insertion of plastic injecting molding of the rotating body 40. The permanent magnet 50 is fixed securely to a base portion 46 of the rotating body 40, and reciprocates and rotates at an angle of about 90 in a reciprocal direction by the actions of the rotating body 40 and a return spring 82.

Here, at the top end head 42 of the rotating body 40 is formed coupling slot 42a for inserting the coupling protuberance 12 of the rotary shaft 10. Therefore, by inserting the coupling protuberance 12 into the coupling slot 42a and fixing it, the rotary force of the rotary shaft 10 is exactly transmitted to the rotating body 40. Also, a joining flange 44 is formed in the middle of the rotating body 40. Therefore, at the same time when the top end head 42 of the rotating body 40 is inserted into the through hole 24 of the cover 20 during assembly, it is possible to support the rotating body 40 within the housing 30 in a rotatable manner, since the joining flange 44 is joined at a suitable interval between the bottom end circumference of the through hole 24 and sensor mounting holes 22. Teeth 24a are formed around the top of through hole 24.

The permanent magnet 50 is inserted in the bottom base 46 of the rotating body 40, and between this base 46 and the joining flange 44, for returning to the original position the rotating body 40 rotated by the rotary shaft 10.

Sensing bars 60 and 62 are placed opposite each other at a given interval at both sides of the permanent magnet 50 which are placed parallel in a manner of embracing the base 46 of the rotating body 40. Also, at the ends of sensing bars 60 and 62 the perpendicularly extending extensions 60a and 62a, 60b and 62b respectively are formed, and in the gap between extensions 60a and 62a, 60b and 62b, two hall elements 72 and 73 are placed. These hall elements 72 and 73 are joined to PCB 70, acting the role of transmitting the displacements of permanent magnet 50 sensed through sensing bars 60 and 62.

Two long slots 34 are formed lengthwise in the housing 30 forming the external appearance of rotary positioning sensor 1 where the sensing bars 60 and 62 are inserted. Between these long slots 34, receipt seat 32 is formed where receipt protuberance 48 formed on the base 46 of the rotating body 40, is received in a rotatable manner. Also, on the bottom of the housing 30, fixing holes 36 are formed for fixing the PCB 70, and at the rear end, a bottom crimp terminal 38 is formed for preventing float by crimping wires 74 together with a top crimp terminal 28 formed at the bottom end of the cover 20.

For assembly, two sensing bars 60 and 62 are placed in long slots 34 of the housing 30, and the PCB 70 is placed on the bottom of the housing 30 while hall elements 72 and 73 are placed between extensions 60a and 62a, 60b and 62b of sensing bars 60 and 62.

At this time, the hall elements 72 and 73 are fixed on the bottom of the housing 30 by welding, for example. Next, the base 46 of rotating body 40 that has permanent magnet 50 inserted is placed on the receipt seat 32 of the housing 30. At this time, between the joining flange 44 of the rotating body 40 and the base 46 is the return spring 82 wound in advance, and one end of the return spring 82 is fixed on the joining flange 44 and the other end is supported by the inner wall of the housing 30.

Next, the cover 20 is placed and joined on the top of the housing 30, while inserting a rubber O-ring 80 in the top end head 42 of the rotating body 40 to prevent inflow of water or foreign matter from outside. In this process, wires 74 are inserted and connected to the rear end of the PCB 70 between the top crimp terminal 28 of the cover 20 and the bottom crimp terminal 28 of the housing 30 to crimp them, and then adhesives such as silicone are injected through adhesive injecting holes 26 for assembly.

In such a state of assembly, the coupling protuberance 12 of the rotary shaft 10 is joined to to the coupling slot 42a formed on the top end head 42 of the rotating body 40 to complete assembly, and the rotary positioning sensor of the present invention is mounted on the object to be measured through sensor mounting holes 22. At this time, the rotary shaft 10 is assembled in such a manner that it can rotate as a single body together with the rotating part of the object to be measured.

On the other hand, the base portion 46 of the rotating body 40 has an elliptical form as illustrated, so it has a structure whereby a 360-degree rotation is impossible inside the sensing bars 60 and 62. The sensing bars 60 and 62 play a role of a stopper that prevents rotation of the base portion 46. Namely, it prevents the base portion from moving at an angle exceeding about 90 degrees in the positive direction. Therefore, the angle of rotation in the base portion becomes smaller, and as a result, it is characterized by the ability of minimizing the air gap.

Figure 4:
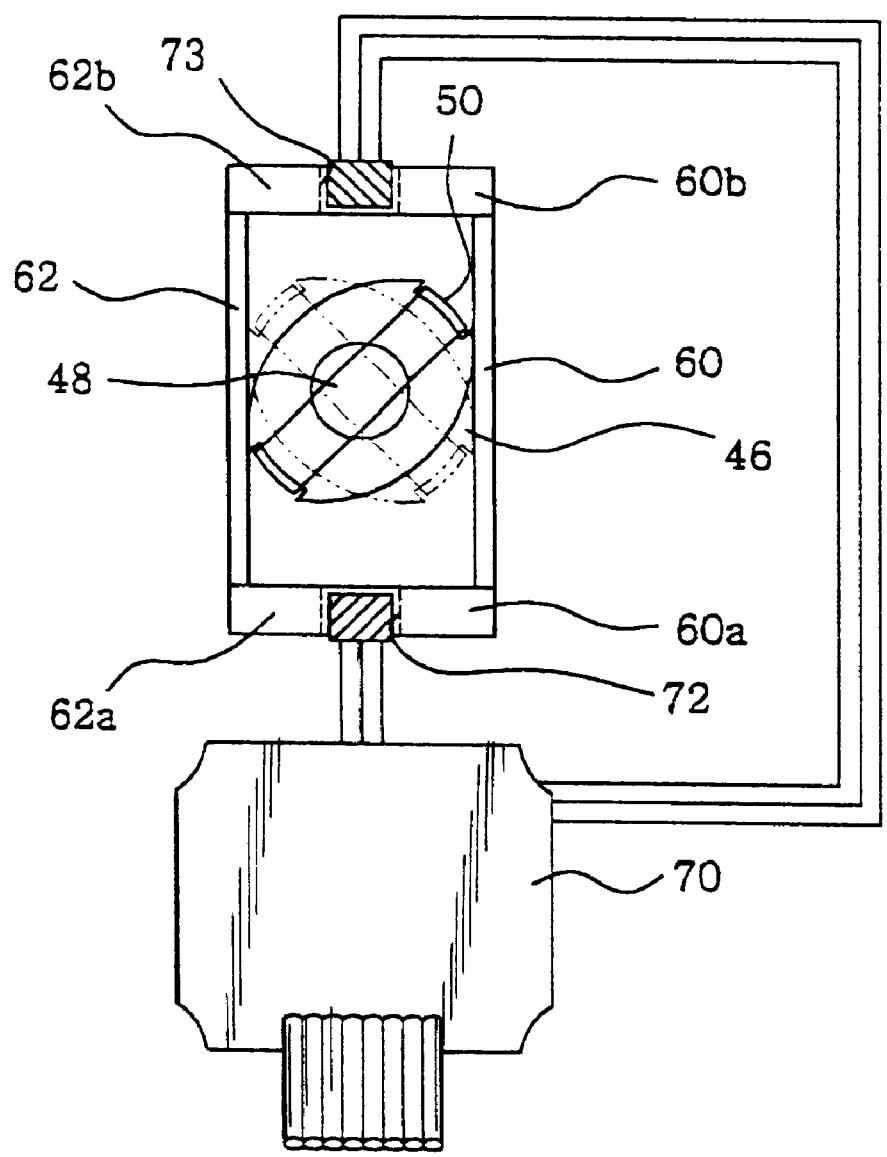
FIG. 4 is a schematic plane view of a permanent magnetic and sensing bars in accordance with the present invention

Next, FIG. 4 is a sketch showing a layout of the sensing bars and permanent magnet of the present invention. As shown here, the pair of sensing bars 60 and 62 is placed opposite each other across a given interval (air gap) between both ends when each pair is positioned on a straight line with both ends of the permanent magnet 50. The hall elements 72 and 73 are placed between the upper and lower extensions 60a and 62a, 60b and 62b formed opposite each other on both ends of sensing bars 60 and 62. Because of the placing of the hall elements, the magnetic field strength according to variation of the distance between both ends of the permanent magnet 50 (which is transmitted through the rotary shaft 10 and the rotating body 40), can be transmitted to the hall elements 72 and 73. Also, since the direction of the transmitted magnetic field is changed according to the direction wherein the upper and lower surfaces of the hall elements 72 and 73 are inserted between the sensing bar extensions 60a, 62a, 60b and 62b, the output signals of the sensor are outputted positive or reverse. Namely, by positioning the sensing bars 60 and 62 closer to the inside of the magnetic field that is formed by the permanent magnet assembled to the elliptical base portion 46, the position sensor detects the changes of magnetic field by rotation of the permanent magnet, so that the sensing bars serve as sensor output.

Since both ends of sensing bars 60 and 62 that are embracing the permanent magnet 50, are placed in such a manner that one magnetic field strength of the same permanent magnet 50 is transmitted to two hall elements 72 and 73 at the same point, an imbalance of the magnetic force line caused by the inconsistency of an air gap between the rotating body 40 and sensing bars 60 and 62 can be compensated. The electric signal detected at the hall element 72 is converted into digital signal by the PCB 70 before it is outputted as an output signal and a switch signal. As illustrated, it is designed to ensure the reliability of the sensor when using two hall elements, by providing two proportional and mutually complementing signals with respect to the same angle of rotation through two hall elements for the magnetic field strength of one identical permanent magnet 50.

Figure 5:
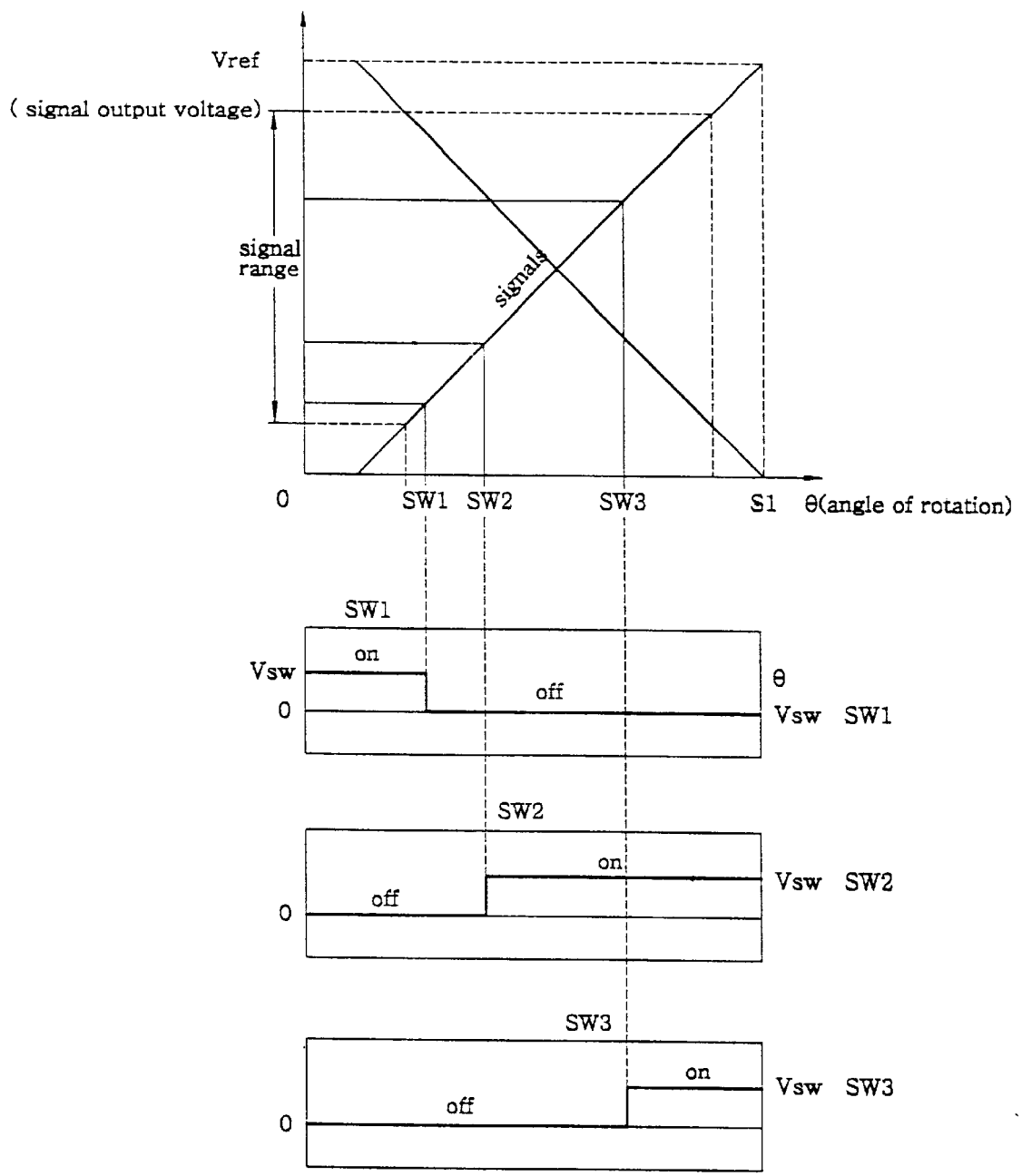
FIG. 5 is a graph showing the relation between voltage and angle of rotation at the rotary positioning sensor of the present invention.

Next, FIG. 5 is a graph showing the relation between voltage and angle of rotation at the rotary positioning sensor of the present invention. In this graph, the abscissa represents an angle of rotation (θ) of the permanent magnet 50 and the ordinate represents output voltage (Vs). Signals outputted from sensor 1 are shown by the graph between angle of rotation (q) and output voltage (Vs).

As illustrated here, we can see output voltage (Vs) is obtained in proportion to angle of rotation (θ) in the rotary positioning sensor 1 of the present invention. Also, it is designed to obtain at least two switch signals at two or more given voltage potentials of output signal. At this time, it is possible to change appropriately as necessary the on-off state of the switch signal.

Figure 6:
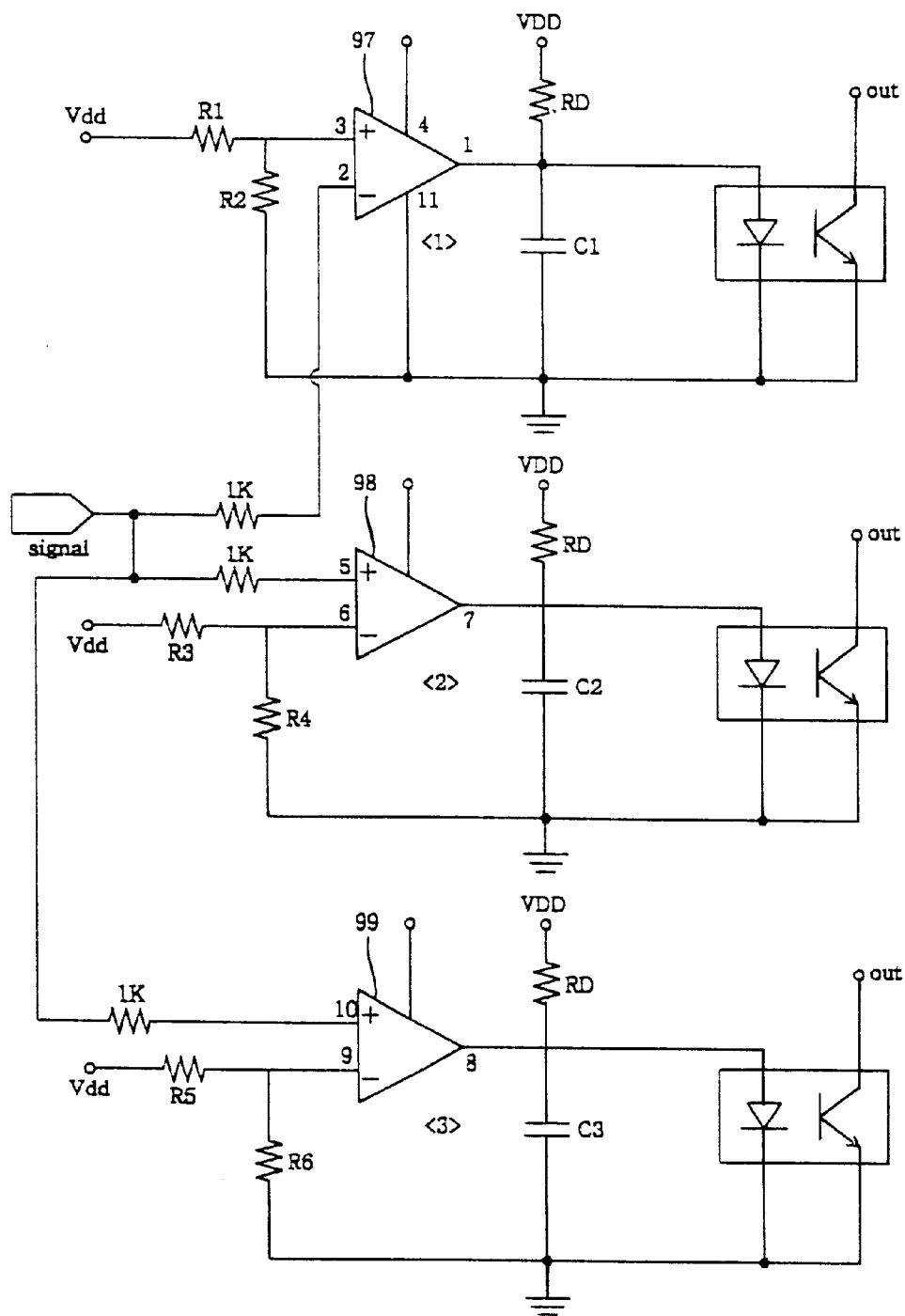
FIG. 6 is a schematic circuit diagram of comparator circuit.

FIG. 6 is a schematic circuit diagram showing the processing of linear analogue signals by the comparators in accordance with the present invention. First, the output signal of the hall elements 72 and 73 is inputted using comparators. For the standard voltage of the comparator, Vdd voltage is used to extract three different standard voltages Vref. By using comparators 97, 98 and 99, triggering signals of a given potential can be obtained as desired by the user at 5V or less. This switch can be used to control external equipment. For example, this switch capability could be used with the electromagnetic control unit (ECU) of a vehicle through the photocoupler.

Figure 7:
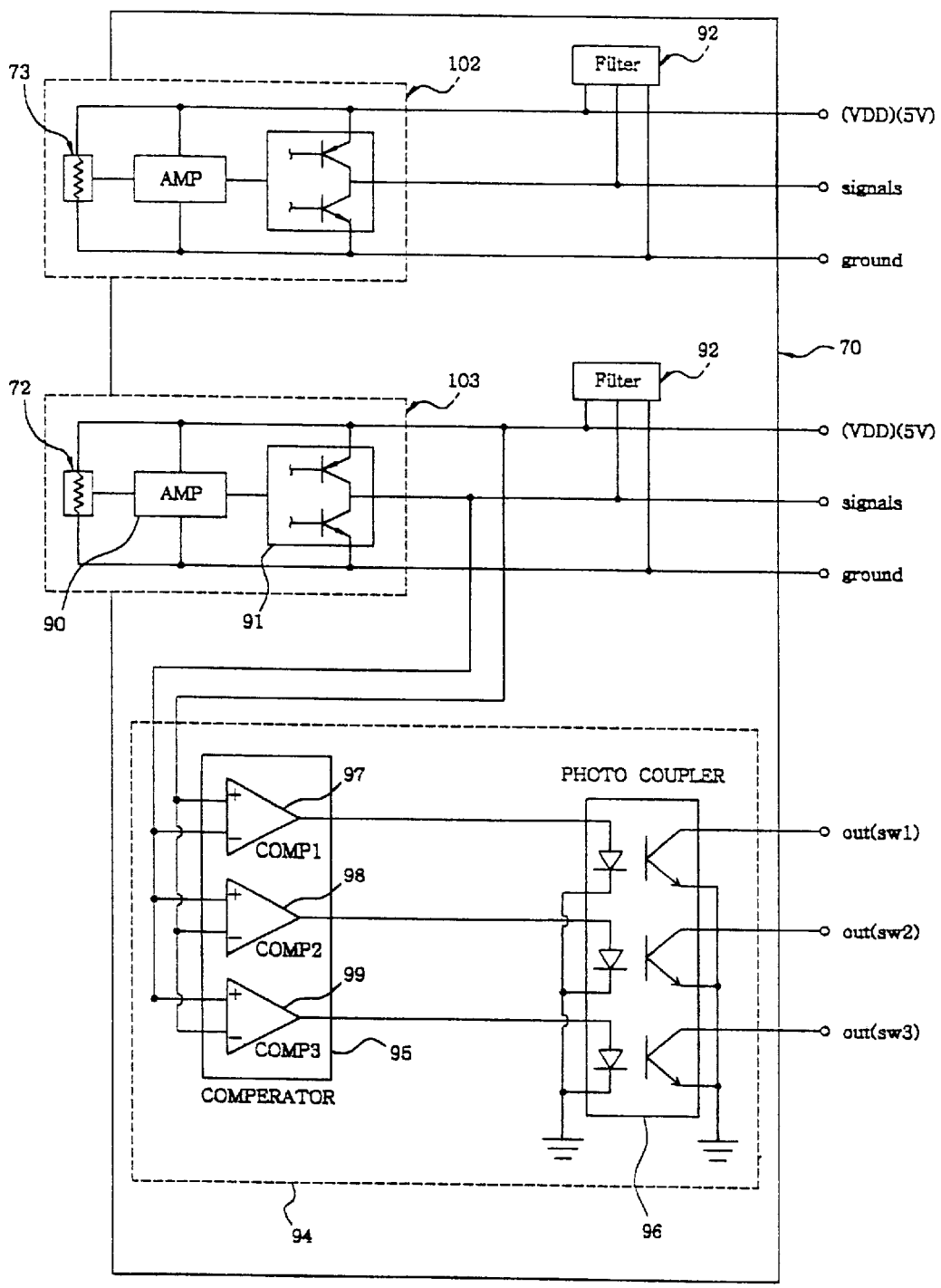
FIG. 7 is a block diagram in accordance with the present invention.

FIG. 7 is a schematic diagram of a PCB according to the present invention. As mentioned above, the changes of the magnetic field generated from the permanent magnet rotating together with the rotating body 40 by the rotary shaft 10 are detected by a pair of sensing bars 60 and 62. The resultant field strength detected at the sensing bars 60 and 62 is transmitted to PCB 70 by the hall elements 72 and 73 placed between the extensions 60a and 62a, 60b and 62b of the pair of sensing bars 60 and 62 in the assembled condition protruding by a given length in the unilateral direction from the unilateral portion of PCB 70, so that the imbalance of the magnetic field generated by the eccentricity of the rotating body 40 is compensated. At this time, the instantaneous intensity of magnetic field detected in proportion to each angle of rotation of the permanent magnet 50 is amplified to high-level voltage through amplifier (AMP) 90, before it is given as an output signal of rotary positioning sensor 1 through wires 74 via compensating circuit 91. The given signal is inputted into the electromagnetic control unit and the comparison logic circuit 94 of the vehicle. This comparison logic circuit can send the inputted signal through the comparators 97, 98, 99 as a comparison signal at a desired voltage.

This signal activates the photocouplers 96, which directly drive the connected load respectively.

Filter 92 located at the front end of input voltage Vref, is composed of an RC circuit, and stabilizes within ±0.1% of the voltage supplied from the electronic controller of the object to be measured (e.g., engine or electric motor) for stable supply to the integrated circuit and comparison logic circuit of the hall elements 72 and 73, so that a stable output signal can be guaranteed even during unstable power supply.

The PCB 70 is equipped with an independent current circuit so that the photocoupler 96 can operate as a short-circuit switch of a high-voltage power source, separately from the hall elements 72 and 73.

Figure 8:
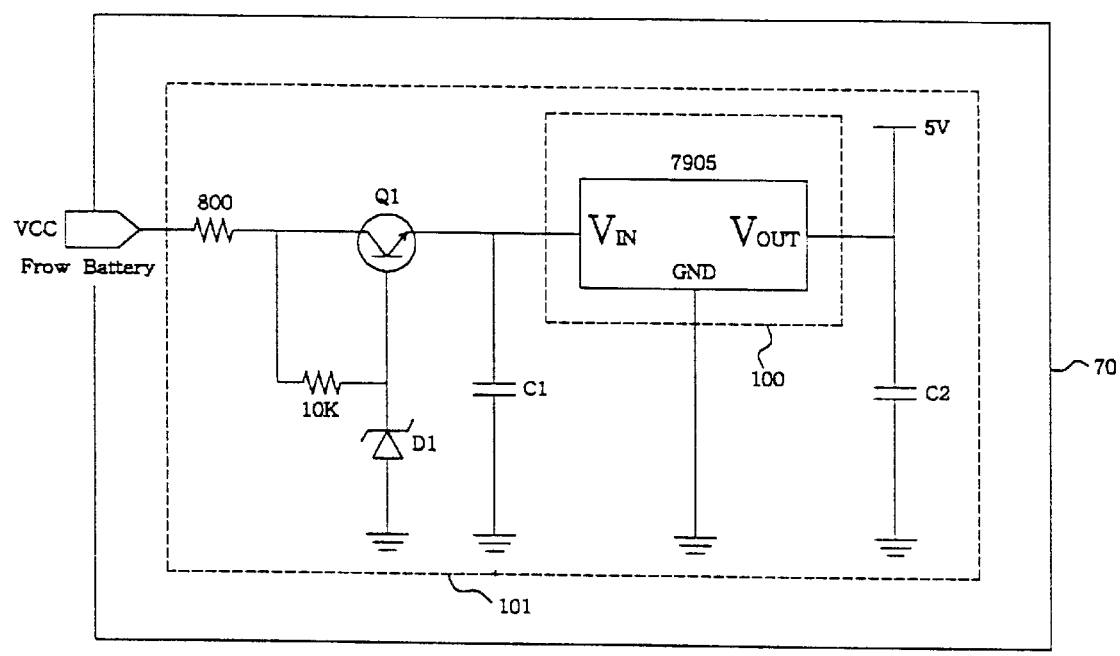
FIG. 8 is a circuit diagram for a power stable circuit of power supplying part in accordance with the present invention.

FIG. 8 is a circuit for supplying power to the circuit of FIG. 7, and it is designed for example, to supply power with stability from the battery of a vehicle in a volume sufficient to directly drive the load connected to photocouplers 96 respectively. The power supply portion 70 is designed with a free voltage circuit 101 that eliminates voltage pulsation from the power supplied from the battery using the regulator 100, and blocks power source noise to convert to a stable voltage level. This circuit makes the present sensor effectively correspond to the voltage level that is different according to the vehicle applied, and also plays a role of protecting the control portions 72, 73 and circuit 94 of FIG. 7 from over-voltage.

Figure 9:
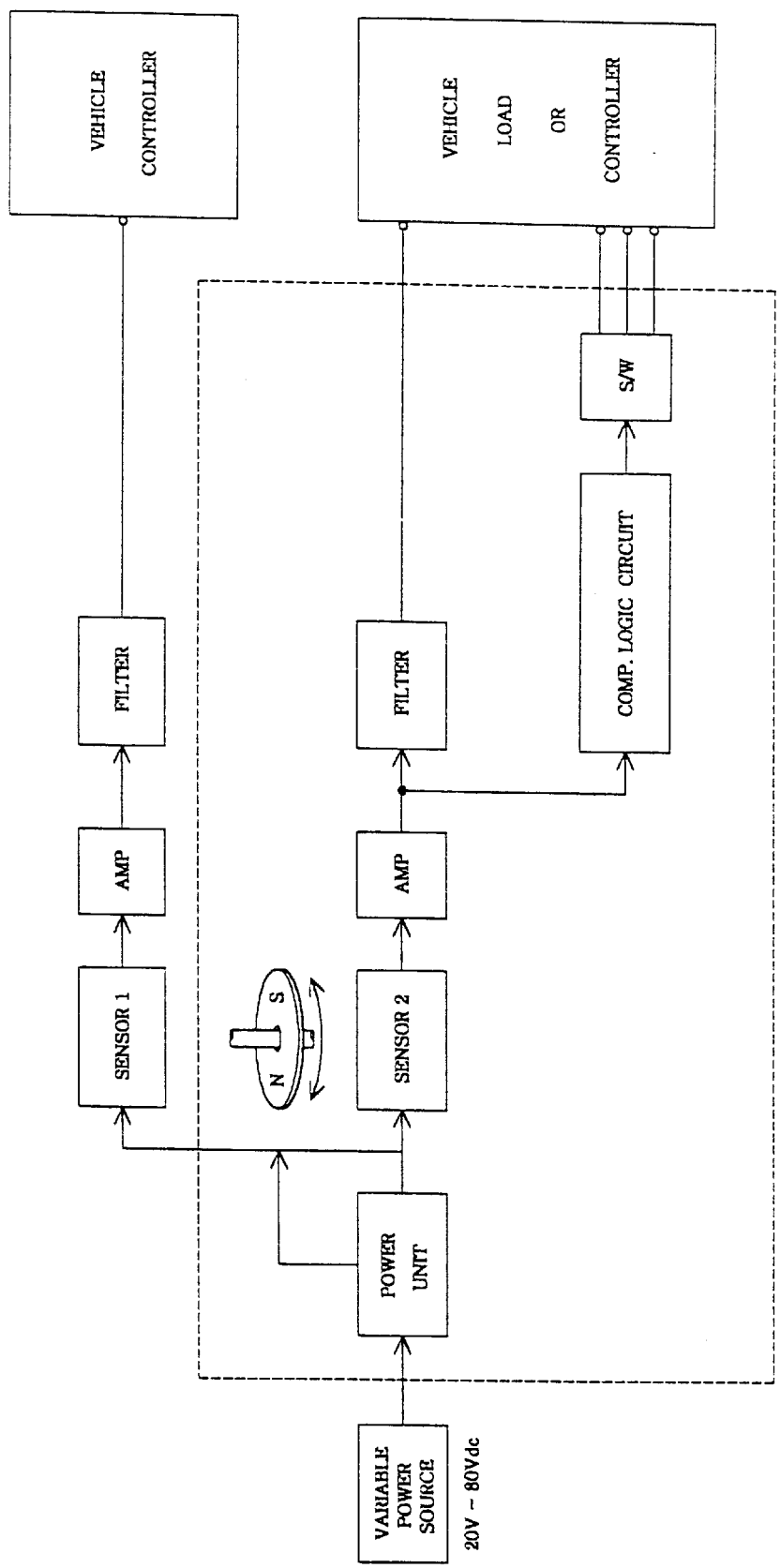
FIG. 9 is a is a block diagram of 2-channel rotary positioning sensor in accordance with the present invention.

FIG. 9 is a block diagram schematically showing the processing of signals by the present rotary positioning sensor, wherein the driving power is stabilized by supplying the outside unstable pulsating direct current power and then using the hall elements 72 and 73 to detect each displacement that changes according to the rotary displacement of the rotary shaft 10. The detected displacement is converted to a linear analog signal and sent to the comparison logic circuit portion 95 inside the electromagnetic control unit and sensor of a vehicle for example. The signal transmitted directly to an electromagnetic control unit (ECU) of a vehicle is used to control the throttle valve of the vehicle, and the signal transmitted to the comparison logic circuit can be used to drive or stop the loads of the connected vehicle by activating each switch at a given voltage position.

According to the present invention as described above, it is possible to provide a semi-permanent sensor that can maintain an endurance period of more than 1,000 times in the intensity of the magnetism obtained by a 2-channel non-contact rotary displacement measuring method whereby the intensity of magnetic force is perceived according to the movement of the rotating body, and that can operate smoothly even under extreme operating conditions of a vehicle or farm machine while maintaining an exact measurement error range of ±1%.

While a specific embodiment of the invention has been shown and described in detail to illustrate the application of the principles of the invention, it will be understood that the invention may be embodied otherwise without departing from such principles.

What is claimed is:

1. A less current consuming non-contact type 2-channel rotary positioning sensor, comprising:
   a housing with a base that has a receipt seat formed on the base;
   a cover with sensor mounting holes and a through hole for covering the housing;
   a rotating body having a base, an end that sits on the receipt seat of the housing, a middle flange joined to a circumference of the through hole of the cover to be supported in a rotatable manner within the housing, and a top end formed with a coupling slot;
   a rotary shaft having one end coupled with the rotating body by a coupling protuberance inserted into the coupling slot and another end coupled with a rotary object to be measured;
   a permanent magnet inserted into the base of the rotating body,
   sensing bars with interposed hall elements, placed in parallel around the base of the rotating body to detect the permanent magnet in the base of the rotating body; and
   a PCB accommodating comparators, a microprocessor, and photocouplers placed in the housing for accepting a signal from hall elements that are interposed with the sensing bars.

2. A less current consuming non-contact type 2-channel rotary positioning sensor according to claim 1, wherein an imbalance of magnetic force line caused by an inconsistency of air gap between the rotating body and sensing bars is compensated due to placement of both ends of sensing bars so that a magnetic field strength of the permanent magnet is transmitted to one or more hall elements of a same point, allowing a production of more than one linear analog signal.

3. A less current consuming non-contact type 2-channel rotary positioning sensor according to claim 1 wherein the PCB is provided with a differential amplifier type comparator which can allow a change of operating position of the switches without a need for a redesign of a non-contact potentiometer.

4. A less current consuming non-contact type 2-channel rotary positioning sensor according to claim 1 further comprising a filter on the PCB to stabilize supply voltage to within ±0.1%, ensuring a stable output.

5. A less current consuming non-contact type 2-channel rotary positioning sensor according to claim 1 wherein the PCB is provided with at least of one photocoupler switching device.

6. A less current consuming non-contact type 2-channel rotary positioning sensor according to claim 1 wherein the base portion of the rotating body has an elliptical configuration to prohibit a 360-degree rotation of itself inside the sensing bars and prevents an air gap to sensing bars so that linear analog signals are obtained.

* * * * *